(12) United States Patent
Silvers et al.

(10) Patent No.: US 6,568,156 B2
(45) Date of Patent: May 27, 2003

(54) METHOD OF PROVIDING A THERMALLY-PROCESSED COMMODITY WITHIN A PLASTIC CONTAINER

(75) Inventors: Kerry W. Silvers, Chelsea, MI (US); Timothy J. Boyd, Ypsilanti, MI (US); George Calendine, Lambertville, MI (US)

(73) Assignee: Schmalbach-Lubeca AG (DE)

( * ) Notice: Subject to any disclaimer, the term of this patent is extended or adjusted under 35 U.S.C. 154(b) by 0 days.

(21) Appl. No.: 09/822,600

(22) Filed: Mar. 30, 2001

(65) Prior Publication Data

US 2002/0020149 A1 Feb. 21, 2002

Related U.S. Application Data

(63) Continuation-in-part of application No. 09/607,262, filed on Jun. 30, 2000, now abandoned.

(51) Int. Cl.[7] ............................ B65B 55/14; B65B 63/08
(52) U.S. Cl. ............................ 53/440; 53/140; 53/452; 53/471; 53/490
(58) Field of Search ........................ 53/452, 490, 471, 53/140; 215/44, 329; 264/230

(56) References Cited

U.S. PATENT DOCUMENTS

| | | | |
|---|---|---|---|
| 4,015,401 A | * | 4/1977 | St. Amand et al. ............ 53/425 |
| 4,039,641 A | | 8/1977 | Collins |
| 4,091,059 A | | 5/1978 | Ryder |
| 4,151,250 A | | 4/1979 | Barry et al. |
| 4,154,920 A | | 5/1979 | Jabarin |
| 4,244,913 A | | 1/1981 | Ryder |
| 4,264,558 A | | 4/1981 | Jacobsen |
| 4,375,442 A | | 3/1983 | Ota et al. |
| 4,379,099 A | | 4/1983 | Ota et al. |
| 4,385,089 A | | 5/1983 | Bonnebat et al. |
| 4,476,170 A | | 10/1984 | Jabarin |
| 4,512,948 A | | 4/1985 | Jabarin |
| 4,522,779 A | | 6/1985 | Jabarin |
| 4,572,811 A | | 2/1986 | Ota et al. |
| 4,590,021 A | | 5/1986 | Ota et al. |
| 4,618,515 A | | 10/1986 | Collette et al. |
| 4,667,454 A | | 5/1987 | McHenry et al. |
| 4,790,741 A | | 12/1988 | Takakusaki et al. |
| 4,850,850 A | | 7/1989 | Takakusaki et al. |

(List continued on next page.)

FOREIGN PATENT DOCUMENTS

WO    WO96/30190    10/1996

OTHER PUBLICATIONS

The Crystallization of Oriented Poly(ethyleneterephthalate), F.S. Smith and R.D. Steward, Cl Fibres, Hookstone Road, Harrogate, Yorkshire HG2 8QN, UK, Received May 15, 1973; revised Jun. 26, 1973.

The Crystallization of Poly(ethyleneterephthalate) and Related Copolymers, J.B. Jackson and F.W. Longman, Paper Presented at the SPE 27th Annual Technical Conference, Chicago, May 1969.

Crystallization and Thermal Stabilization of Heat Set PET, S.A. Jabarin, accepted for publication in the Polymeric Materials Encyclopedia.

*Primary Examiner*—Rinaldi I. Rada
*Assistant Examiner*—Hemant M Desai
(74) *Attorney, Agent, or Firm*—Harness, Dickey & Pierce, P.L.C.

(57) ABSTRACT

A method for providing a thermally processed commodity in a plastic container. The container is exposed to elevated temperatures to form an—intermediate finish section. A commodity is dispensed within the plastic container. A closure engages the intermediate finish section. The container and the commodity are thermally processed. The finish section being within a predetermined range whereby the finish section and the closure result in retaining a hermetic seal.

12 Claims, 5 Drawing Sheets

U.S. PATENT DOCUMENTS

| | | |
|---|---|---|
| 4,863,046 A | 9/1989 | Collette et al. |
| 4,883,631 A | 11/1989 | Ajmera |
| 5,261,454 A | 11/1993 | Ota |
| 5,431,291 A | 7/1995 | LaBombarbe, Jr. |
| 5,588,544 A | 12/1996 | Takashima et al. |
| 5,735,420 A | 4/1998 | Nakamaki et al. |
| 5,762,982 A | 6/1998 | Knepper et al. |
| 5,858,300 A * | 1/1999 | Shimizu et al. .............. 215/371 |
| 5,902,539 A * | 5/1999 | Schmidt et al. .............. 264/255 |
| 5,908,128 A | 6/1999 | Krishnakumar et al. |
| 6,062,408 A | 5/2000 | Beck et al. |
| 6,139,812 A | 10/2000 | Potter et al. |
| 6,217,818 B1 | 4/2001 | Collette et al. |
| 6,217,959 B1 * | 4/2001 | Slat ........................... 215/12.1 |

\* cited by examiner

METHOD OF PROVIDING A THERMALLY-PROCESSED COMMODITY WITHIN A PLASTIC CONTAINER

CROSS-REFERENCE TO RELATED APPLICATIONS

This application is a continuation-in-part of U.S. patent application Ser. No. 09/607,262 filed on Jun. 30, 2000, now abandoned, the disclosure of which is incorporated herein by reference.

TECHNICAL FIELD OF THE INVENTION

This invention generally relates to methods for providing a thermally-processed commodity. More specifically, this invention relates to a method for providing a thermally-processed commodity retained within a plastic container having a finish section properly engaged with a closure.

BACKGROUND

Recently, manufacturers of polyethylene terephthalate (PET) containers have begun to supply plastic containers for commodities that were previously packaged in glass containers. The manufacturers, as well as consumers, have recognized that PET containers are lightweight, inexpensive, recyclable, and manufacturable in large quantities. Manufacturers currently supply PET containers for various liquid commodities, such as juices. They also desire to supply PET containers for solid commodities, such as pickles. Many solid commodities, however, require pasteurization or retort, which presents an enormous challenge for manufactures of PET containers.

Pasteurization and retort are both methods for sterilizing the contents of a container after it has been filled and capped with a closure. Both processes include the heating of the contents of the container to a specified temperature, usually above 70° C., for a duration of a specified length. In low temperature pasteurization, the bottle is generally exposed to temperatures up to 75° C. In high temperature pasteurization, the bottle is generally exposed to temperatures greater than 75° C. Retort differs from pasteurization in that retort applies external pressure to the container. This overpressure is necessary because a hot water bath is often used and the overpressure keeps the water in liquid form above its atmospheric boiling point temperature. During the pasteurization or retort process, the finish section of a typical PET container shrinks considerably. This shrinkage of the finish section prevents proper engagement of the finish section with the closure, which may lead to leakage or spoilage of the commodity within the PET container. It has been found that the finish section can be stabilized by inducing spherulitic crystallization into the finish.

PET is a crystallizable polymer, meaning that it is available in an amorphous form or a semi-crystalline form. The ability of a PET container to resist shrinkage is related to the percentage of the PET container that is in crystalline form, also known as the "crystallinity" of the PET container. Crystallinity is characterized as a volume fraction by the equation:

$$\text{Crystallinity} = \frac{\rho - \rho_a}{\rho_c - \rho_a}$$

where $\rho$ is the density of the PET material; $\rho_a$ is the density of pure amorphous PET material (1.333 g/cc); and $\rho_c$ is the density of pure crystalline material (1.455 g/cc). The crystallinity of a PET container can be increased by mechanical processing and by thermal processing.

Mechanical processing involves orienting the amorphous material to achieve strain hardening. This processing commonly involves stretching a PET container along a longitudinal axis and expanding the PET container along a transverse axis. The combination promotes biaxial orientation. Manufacturers of PET bottles currently use mechanical processing to produce PET bottles having roughly 20% crystallinity (average sidewall crystallinity).

Thermal processing involves heating the material (either amorphous or semi-crystalline) to promote crystal growth. Used on amorphous material, thermal processing of PET material results in a spherulitic morphology that interferes with the transmission of light. In other words, the resulting crystalline material is opaque (and generally undesirable on the sidewall of the container). Used after mechanical processing, however, thermal processing results in higher crystallinity and excellent clarity. The thermal processing of an oriented PET container, which is known as heat setting, typically includes blow molding a PET preform against a heated blow mold, at a temperature of 120–130° C., and holding the blown container against the mold for about three seconds. Manufacturers of PET juice bottles, which must be hot filled at about 85° C., currently use heat setting to produce PET juice bottles having a range of up to 25–30% crystallinity in their sidewalls and over 30% in their finish sections. Although these hot fill PET containers exhibit a significant improvement over non-hot fill PET containers, they cannot adequately prevent shrinkage of the finish section to properly engage the closure. Depending on the diameter of the finish section, and the temperature and duration of thermal processing, these crystallized finishes have been measured to exhibit shrinkages in the range of 0.4% to 0.8%. With shrinkages in this range, an induction seal is required in addition to the closure cap to ensure the integrity of the seal. This adds cost and complexity to the processing of the container.

Thus, the manufacturers of PET containers desire an efficient and inexpensive method of providing a PET container for a thermally-processed commodity product retained within a PET container having a finish section properly sized and engaged with a closure. It is therefore an object of this invention to provide such a method.

SUMMARY OF THE INVENTION

The present invention includes a method for providing a PET container, which after thermal processing the commodity product retained within the plastic container, has a finish section defining a finish diameter of a predetermined value so as to ensure proper sealing of the container. The invention also includes a method for providing a thermally-processed commodity that overcomes the problems and disadvantages of the conventional techniques in the art.

The present invention in a preferred embodiment is a method for providing a thermally-processed commodity including providing a plastic container having a finish section defining a finish diameter greater than the predetermined value. Then dispensing a commodity product within the plastic container, capping the container with a cap designed to engage a finish having a diameter of the predetermined value. Then, thermally processing the commodity product within the plastic container and shrinking the finish diameter during thermal processing from greater than the predetermined value to about the predetermined value. With a finish diameter at about the predetermined value, the finish section will properly engage the closure, seal the closure and avoid spoilage of the commodity product within the plastic container.

The present invention in an alternate preferred embodiment is a method for providing a thermally-processed commodity including providing a plastic container having a finish section defining a finish diameter that is within a predetermined range. Then dispensing a commodity product within the plastic container, capping the container with a cap designed to engage the finish section defining the finish diameter. Then thermally processing the commodity product within the plastic container, the finish section defining the finish diameter at the conclusion of thermal processing also being within the predetermined range. With the finish section within the predetermined range, the closure retains a hermetic seal to avoid spoilage of the commodity product via breach of the hermetic seal.

Further features and advantages of this invention will become apparent from the following discussion and accompanying drawings.

DETAILED DESCRIPTION OF THE PREFERRED EMBODIMENT

The following description of the preferred embodiment is merely exemplary in nature, and is in no way intended to limit the invention or its application or uses.

Figure 1:
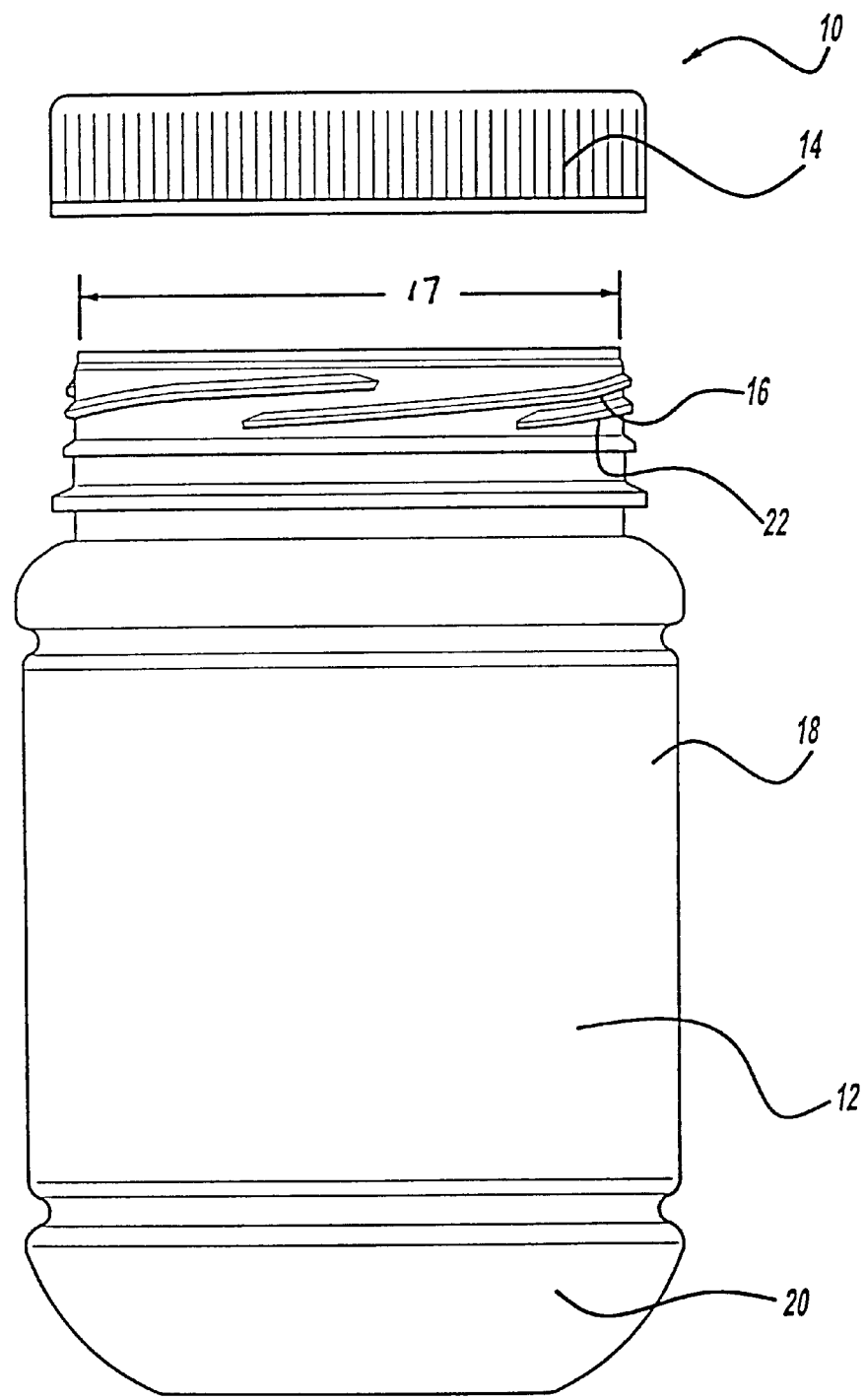
FIG. 1 is a side view of the plastic container system of the preferred embodiment of the invention, shown with the plastic container and the closure of the preferred embodiment of the invention.

As shown in FIG. 1, the plastic container system 10 of the preferred embodiment of the invention includes a plastic container 12 and a closure 14. The plastic container system 10 has been specifically designed for retaining a commodity during a thermal process, such as a high-temperature pasteurization or retort process. The plastic container system 10 may be used for retaining a commodity during other thermal processes as well.

The plastic container 12 of the preferred embodiment of the invention includes a finish section 16 with thread members 22 including an initial finish diameter 17. The plastic container 12 also preferably includes a sidewall section 18 extending generally downward from the finish section 16 and a base section 20 extending generally inward from the sidewall section 18 and closing the bottom end of the plastic container 12. The plastic container 12 may alternatively include other sections, such as a handle section, a grip section, a panel section, or a label section. The plastic container 12 is preferably made from a PET material, but may alternatively be made from other suitable materials including, for example, polyethylene napthalate (PEN), and a PET/PEN blend or copolymer.

The closure 14 of the preferred embodiment of the invention functions to engage with the finish section 16 of the plastic container 12. To achieve this, the closure 14 preferably includes corresponding thread members to thread members 22 of the finish section 16, but may alternatively include other suitable devices to engage the finish section 16 of the plastic container 12. The closure 14 is preferably made from a plastic or metal material conventional to the closure industry and suitable for subsequent thermal processing, including high temperature pasteurization and retort.

The preferred use of the plastic container system 10 includes dispensing a commodity within the plastic container 12, engaging the closure 14 with the finish section 16, and thermally processing the commodity within the plastic container system 10. After the engagement of the closure 14 with the finish section 16, but before the thermal processing of the commodity, the closure 14 and the finish section 16 require a first torque to remove the closure 14 from the finish section 16. The first torque is preferably approximately 50 in-lbs., which is greater than the maximum torque that can be generated by the typical person. In other words, most people will not be able to remove the closure 14 from the finish section 16 before the thermal processing. After the thermal processing of the commodity, removal of the closure 14 from the finish section 16 requires a second torque. The second torque is preferably approximately 15 to 20 in-lbs., which is less than the maximum torque that can be generated by the typical person. In other words, most people will be able to remove the closure 14 from the finish section 16 after the thermal processing.

DETAILED DESCRIPTION OF THE PREFERRED METHOD

The preferred method of the invention provides a thermally-processed commodity which is retained within the plastic container system 10. The system 10 includes providing the plastic container 12, inducing crystallinity in the finish section 16 of the plastic container 12, dispensing a commodity within the plastic container 12, capping the container 12, thermally processing the commodity within the plastic container 12, and allowing shrinkage of the finish section 16 such that the closure 14 and the finish section 16 are properly engaged to produce an acceptable seal. The preferred method has been specifically designed for providing a thermally-processed commodity retained within the plastic container 12 made from a PET material. The preferred method may also provide a thermally-processed commodity retained within the plastic container 12 made from other suitable materials as well.

Figure 2:
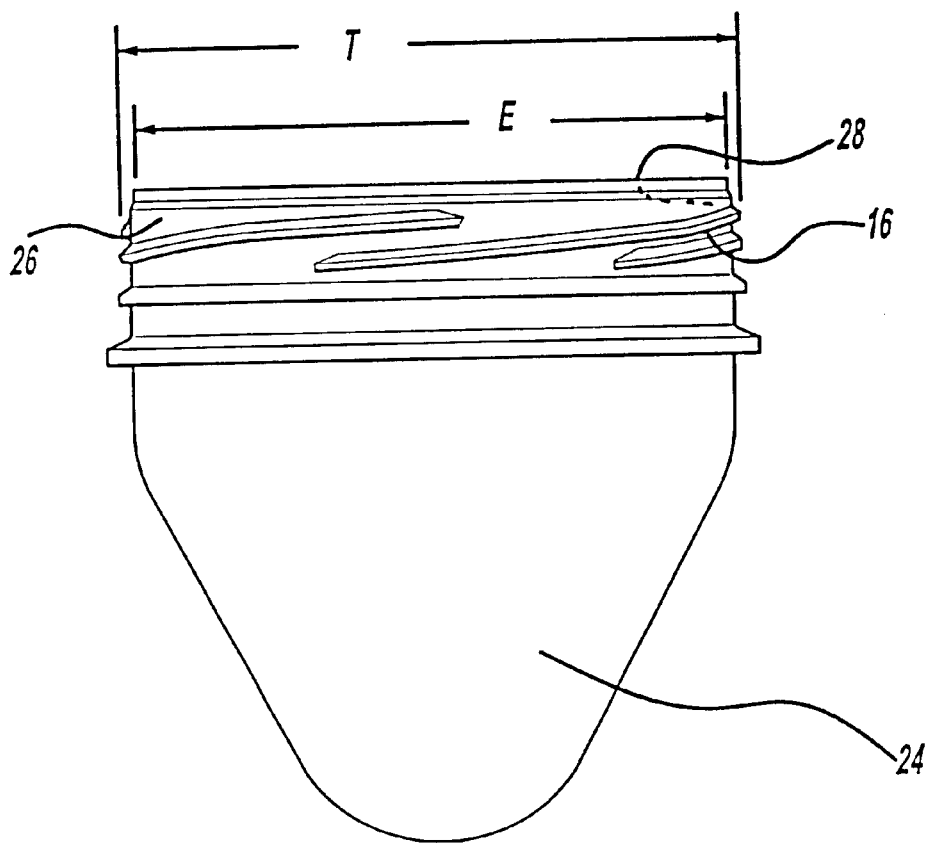
FIG. 2 is a side view of the plastic preform of the preferred embodiment of the invention.

In providing the plastic container according to the preferred method of the invention, the plastic container 12 is provided with the finish section 16 defining an initial finish diameter 17 greater than a predetermined value. The initial finish diameter 17 is preferably calculated based on the outside diameter T of the thread members 22 on the finish section 16 of a preform 24, as shown in FIG. 2. The initial finish diameter 17 may alternatively be calculated based on the outer diameter E of the finish section 16 of the preform 24. The predetermined value is preferably one of several commercially-acceptable values, such as 63 mm or 82 mm so as to be engageable with the closure 14 of a similar size. Predetermined values of 63 mm or 82 mm qualify the plastic container 12 as a "wide-mouth" plastic container since the initial finish diameter 17 will be greater than one-third (⅓) of the container's overall diameter. The predetermined value may alternatively be of other suitable values depending on, among other factors, the commodity retained within the plastic container 12. In providing the plastic container, the plastic preform 24 may be provided or inserted into a mold cavity and expanded and stretched into substantial conformity with the mold cavity to form the plastic container 12.

After the plastic container is formed, crystallinity is induced in the finish section. To achieve this, a high-temperature fluid is circulated over or directed at the exterior portion 26 of the finish section 16. A high-temperature fluid is also directed at or circulated over a constraining plug (not shown), which is engaged with an interior portion 28 of the finish section 16. The use of the constraining plug constrains the finish section 16 to substantially prevent shrinkage of the finish section 16 beyond a secondary predetermined size, as determined by the diameter of the constraining plug, while inducing crystallinity in the finish section. When using these steps, crystallinities greater than 30% crystallinity, such as 35% crystallinity and 40% crystallinity, are achieved. Inducing crystallinity in the finish section 16 may alternatively include other suitable steps.

After the finish section 16 has crystallized, a commodity is dispensed into the plastic container and the closure 14 is engaged with the finish section 16. The closure 14 is designed to engage with the finish section 16 having a finish diameter of the final predetermined value. However, the finish section 16, when first engaged with the closure 14, has a finish diameter greater than the final predetermined value. For this reason, the closure 14 is difficult to engage with the finish section 16 and requires the increased torque mentioned above. To engage the closure 14 with the finish section 16 of this secondary predetermined size, the closure 14 may be softened before engaging the finish section 16. Softening so as to enable expansion of the closure 14 is preferably accomplished by heating, with steam, the closure 14, but may alternatively be accomplished with other suitable thermal processes.

With the commodity sealed in the plastic container 12, the commodity is thermally processed which induces shrinkage of the finish section from the second predetermined value to the final predetermined value. During the thermal process, such as a retort process at 121° C. for 60 minutes, a finish diameter of 63 mm (38% crystallinity) was found to shrink approximately 0.4%. The actual shrinkage of the finish diameter is a function of several factors, including the finish diameter, finish crystallinity, the temperature of the thermal process, and the duration of the thermal process. Because of the use of the wide-mouth finish diameter and the high-temperature exposure during the extended-period thermal process, the shrinkage of the finish section 16 may prevent proper engagement of the finish section 16 with the closure 14. This may lead to spoilage or leakage of the commodity within the container. To overcome these problems, the preferred method of the invention includes forming the plastic container 12 before thermal processing with the finish section 16. The finish section 16 has a secondary finish diameter (after crystallizing) which is greater than the predetermined value. This allows for shrinkage of the secondary finish diameter, during thermal processing, to the predetermined value. By providing these steps, the preferred method of the invention provides a thermally-processed commodity retained within the plastic container 12 having the finish section 16 properly engaged with the closure 14.

In accordance with this method, a container with an injected molded finish diameter is further manufactured such that the finish diameter is formed to a secondary finish diameter. As mentioned above, this further manufacture can include crystallizing the finish section and constraining shrinkage during crystallizing such that the secondary finish diameter is of a size greater than the desired final finish diameter. Depending on the factors influencing shrinkage, as outlined above, the secondary finish diameter will be within a predetermined range larger than the desired finish diameter. During thermal processing, the finish section will shrink from the secondary finish diameter to within a predetermined range of the final finish diameter. The phrase "predetermined range", as used herein, means the predetermined value of the final finish diameter, which is the ideal value for proper engagement between the finish section 16 and the closure 14, plus or minus a predetermined tolerance. This tolerance balances the need for proper engagement of the closure 14 with the finish section 16 and the need for efficient manufacturability of the plastic container 12.

Because of the shrinkage of the finish section during thermal processing, the fit between the closure 14 and the finish section 16 is within an acceptable range and the typical consumer can readily manipulate the closure 14 to open the plastic container 12.

DETAILED DESCRIPTION OF AN ALTERNATE PREFERRED EMBODIMENT

The following description of an alternate preferred embodiment is made exemplary in nature, and in no way is intended to limit the invention or its application or uses.

Figure 3:
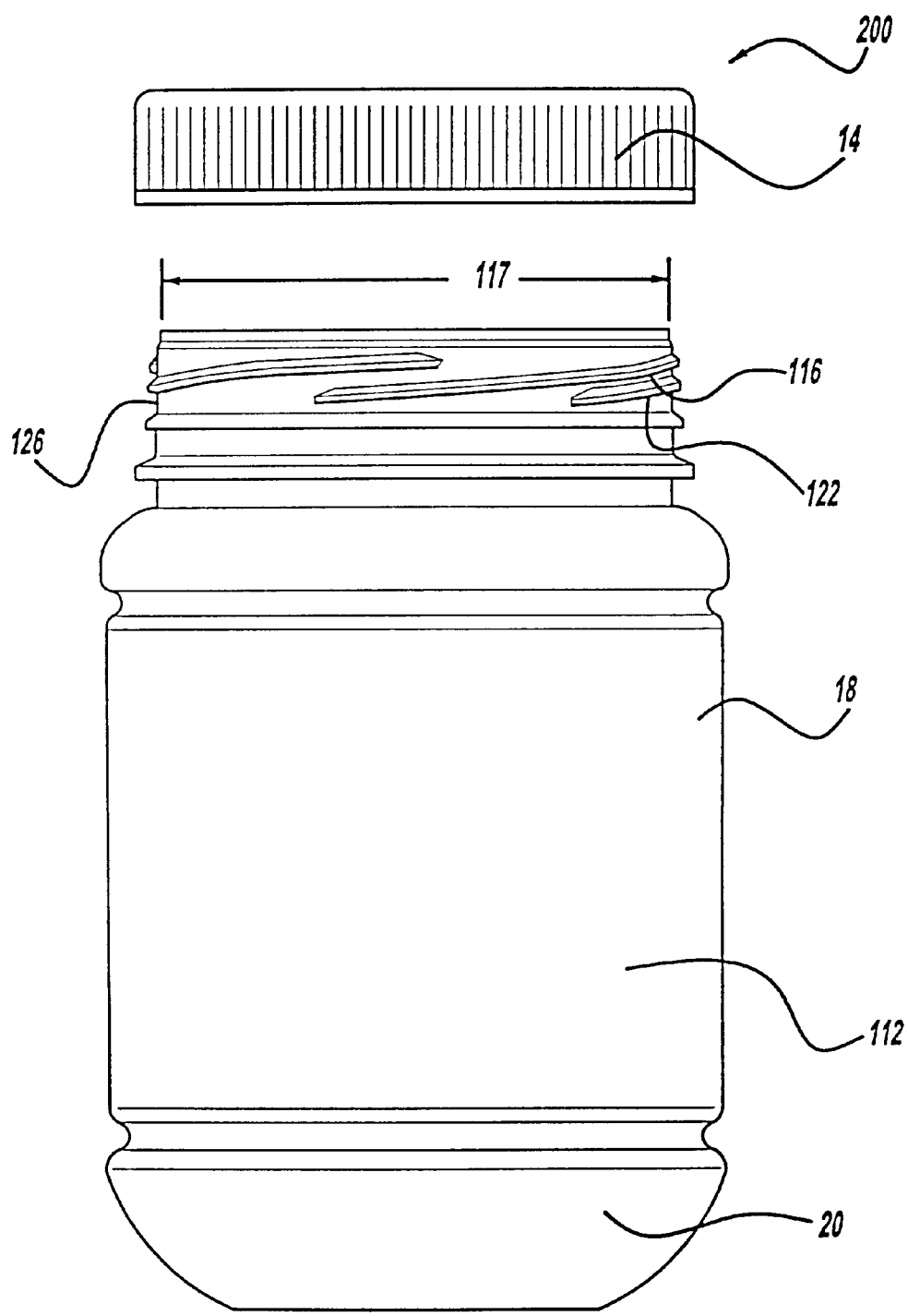
FIG. 3 is a side view of the plastic container system of an alternative embodiment of the invention with an initial finish section and closure.
Figure 4:
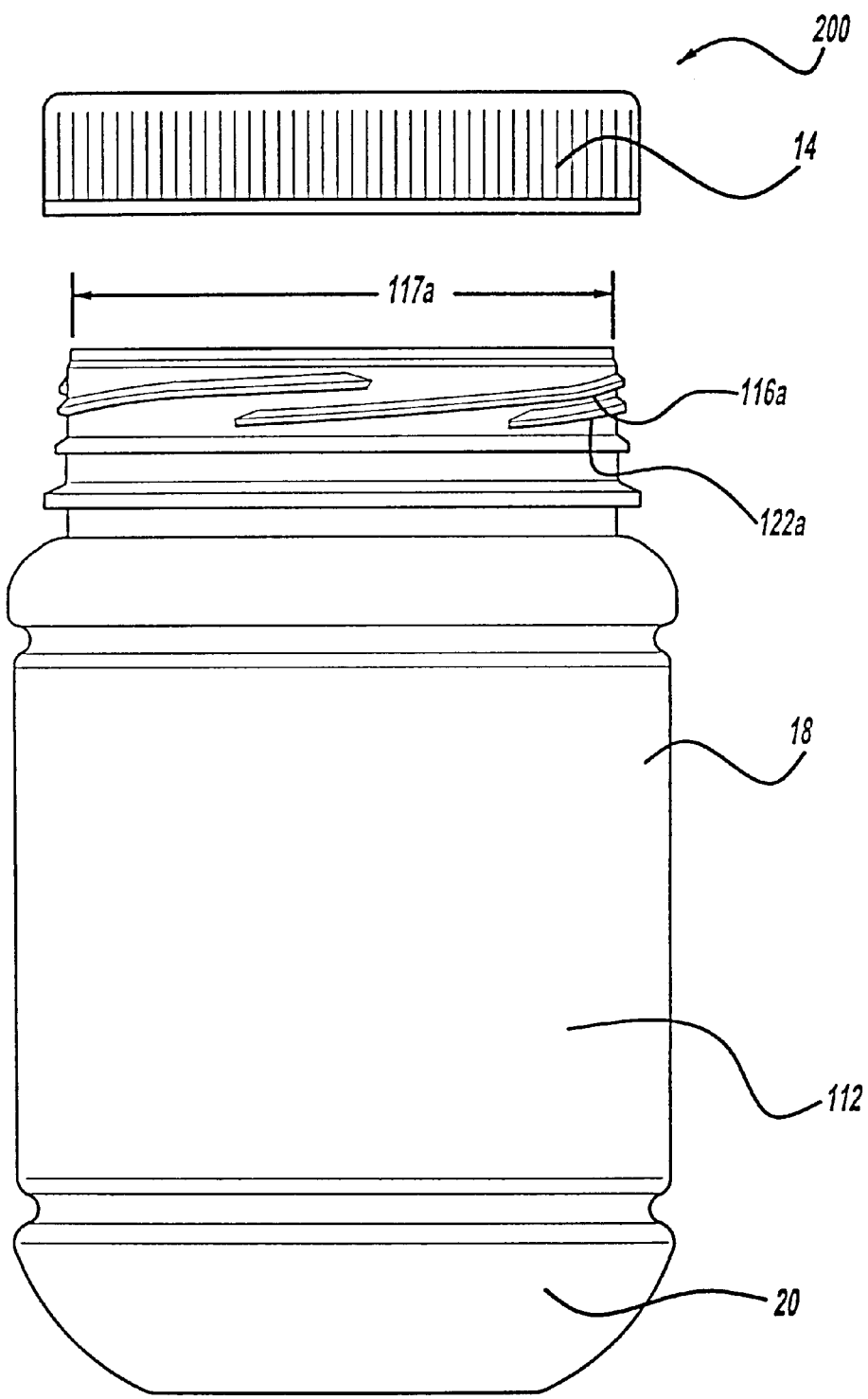
FIG. 4 is a side view of the plastic container system of the alternative embodiment of the invention with an intermediate finish section and closure.
Figure 5:
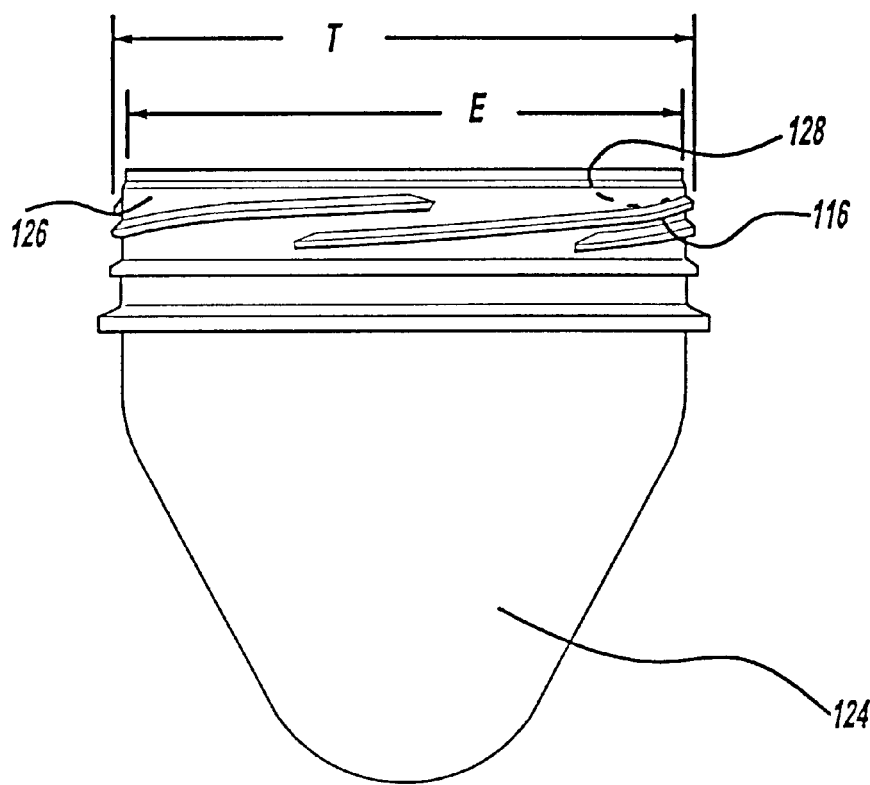
FIG. 5 is a side view of the plastic preform of the alternative embodiment of the invention.

In FIGS. 3–5, an alternate preferred embodiment of the plastic container system is shown. Specifically referring to FIG. 3, the plastic container system 200 of the alternate preferred embodiment includes a plastic container 112 and the closure 14. As with the preferred embodiment, the plastic container system 200 is designed for retaining a commodity during thermal processing, such as for example high temperature pasteurization or retort processes. As with the preferred embodiment, the plastic container system 200 may also be used for retaining a commodity during other types of thermal processing and methods.

Returning to FIG. 3, the plastic container 112 of the alternate preferred embodiment includes a finish section 116 having thread members 122 and the finish diameter 117. The plastic container 112 of the alternate preferred embodiment further includes the sidewall 18 extending downwardly from the finish section 116 and the base section 20 extending generally inwardly from the sidewall 18, closing the bottom end of the plastic container 112. As with the preferred embodiment, the plastic container 112 may alternatively include other sections, such as a handle section, a grip section, a panel section, or a label section. The plastic container 112 is preferably constructed of a PET material, but may alternatively be made from any other suitable materials for forming a plastic container.

The closure 14 of the alternate preferred embodiment is configured, constructed and engaged with the plastic container 112 as previously described.

Similar to the preferred use of the plastic container system 10, the plastic container system 200 includes dispensing a commodity within the plastic container 112, engaging the closure 14 with the intermediate finish section 116a and thermally processing the commodity within the plastic container system 200. Unlike the plastic container system 10, however, the plastic container system 200 requires approximately the same torque to remove the closure 14 from the finish section 116 following thermal processing of the commodity as before thermal processing of the commodity. More particularly, the torque required to remove the closure 14 from the finish section 116 in the plastic container system 200 is such that most people would be able to remove the closure 14 from the intermediate finish section 116a before thermal processing of the commodity as well as after thermal processing.

DETAILED DESCRIPTION OF THE ALTERNATE PREFERRED METHOD

With reference to FIGS. 3–5, the alternate preferred method for forming the alternate preferred embodiment is achieved via a two-step process. More particularly, in broad terms, the plastic container 112 shown in FIG. 4 is formed from the preform 124 shown in FIG. 5, through any one of several acceptable processes. After forming the container 112 shown in FIG. 4, an intermediate finish section 116a is formed by inducing crystallinity via the application of thermal energy resulting in an appropriate degree of shrinkage. Optionally, to further achieve the desired shrinkage and the removal of stresses within the material, the intermediate finish section 116a is annealed by the application of thermal energy. Thereafter, the plastic container 112 is filled with a commodity, the closure 14 is applied and the commodity is thermally processed. Following thermal processing, the finish section 116 and the finish diameter 117 of the plastic container 112 are within the predetermined range. The predetermined range is being defined as the acceptable shrinkage that can result in the finish section 116 without affecting sealing of the closure 14 following thermal processing. This range is preferably +0.005 to −0.0010 inches. It should be understood that this range may vary based on numerous parameters as described herein. It should also be understood that the range takes into account growth in certain directions, including for example changes in ovality.

With further reference to the plastic container 112 as referenced in FIG. 4, the intermediate finish section 116a is first formed via the preform 124 shown in FIG. 5. The preform 124 has the initial finish diameter 117 that is preferably calculated based on the outside diameter T of the thread members 122 or alternatively based on the outer diameter E as shown in FIG. 5. As noted above, the intermediate finish section 116a and therein the intermediate finish diameter 117a undergo a predetermined amount of shrinkage following induced crystallinity through the application of thermal energy. The predetermined range as fully described herein is the acceptable range at which any additional shrinkage of the intermediate finish section 116a to the finish section 116 during thermal processing of the commodity does not result in breach of the hermetic seal. The predetermined range is determined based on the most suitable values and factors including the material used in constructing the plastic container 112, the commodity retained within that plastic container 112, the method of thermal processing used and other factors.

Ultimately, it should be understood that the alternate preferred embodiment is achieved through a two-step process resulting in obtaining the desired shrinkage of the intermediate finish section 116a and therein the intermediate finish diameter 117a, such that after dispensing of a commodity and application of the closure 14, thermal processing may cause additional shrinkage and/or growth in certain dimensions within the predetermined range to achieve the finish section 116 having the finish diameter 117.

Returning to FIG. 4, the plastic container 112 having the intermediate finish section 116a is subjected to known methods for inducing crystallinity. One example to achieve crystallinity is to circulate high temperature fluid over or directed at the exterior portion 126 of the intermediate finish section 116a. The high temperature fluid can also be directed at or circulated over a constraining plug (not shown), engaged with an interior portion 128 of the intermediate finish section 116a. Thus, crystallization can be performed with no constraining plug (free crystallization) or with a constraining plug (constrained crystallization). Free crystallization requires a cooling (sizing) plug (not shown) to be inserted into and engaged with the finish section 116 after crystallization has been completed. As has already been described in the preferred embodiment and the method for the preferred embodiment, use of these types of steps results in crystallinity greater than 30 percent. Optionally, the container 112 shown in FIG. 4 having the intermediate finish section 116a, can further be processed in order to achieve a greater degree of shrinkage and stability of the finish section 116 as reflected in FIG. 3.

In conventional crystallization techniques, because the intermediate finish section 116a is actively cooled after crystallization has been completed, stresses can be introduced into the plastic container 112. For certain applications that currently exist, i.e., hot fill (up to 97° C.), the intermediate finish section 116a remains adequately dimensionally stable to function properly. However, processing containers with crystallized finishes under high temperature pasteurization or retort conditions can expose the intermediate finish section 116a to sufficient time and temperatures to cause the dimensions to sufficiently change interfering with proper closure function. In order to further control shrinkage and induce stability, optionally annealing the intermediate finish section 116a, is desired. Specifically, the induced crystallization proceeds in a constrained (plug) mode, as described. Instead of cooling the intermediate finish section 116a, it is maintained at an elevated temperature (e.g., 90–150° C.) at the time of plug ejection. This so called annealing temperature should be preferably 5–60° C. greater than the ultimate use temperature the finish will subsequently be exposed to, e.g., in a 121° C. retort process, 150° C. can be an appropriate annealing temperature. Removing the constraining plug has the effect of free annealing the finish. Because, the injection stresses are equalized during the crystallization process, the shrinkage occurring is dictated by the diameter of the constraining plug. Since all of the constraining plugs used are of a similar diameter, the final dimensions attained after this annealing step are consistent. Subsequent reheating of the intermediate finish section 116a, such as occurs during the retort or pasteurization (or hot fill) process, results in little to no additional dimensional changes in the finish section 116, i.e., the finish section 116 remaining within the predetermined range, making the finish section 116 and therein the finish diameter 117 shown in FIG. 3 appropriate for retaining a seal following thermal processing of the commodity.

In an alternate approach to the optional annealing process described above, after free or constrained crystallization the container 112 is removed from the crystallizing machine, and an additional heat treatment is effected on the intermediate finish section 116a. The container 112 could be taken directly off the crystallizing machine (i.e., intermediate finish section 116a at a temperature above ambient) or at a later time (or location) when the intermediate finish section 116a has equilibrated to the temperature of the surroundings. In either instance, the intermediate finish section 116a is exposed to elevated temperatures, e.g., 90° C.–150° C., for a short period of time, e.g., 1–30 seconds. This results in the stresses in the finish created by the cooling operation being annealed such that subsequent thermal processing results in little to no significant dimensional changes in the intermediate finish section 116a, i.e., the finish section 116 remains within the predetermined range. This method of heating can consist of infrared (IR) lamps, hot air, or any other suitable sources. This operation can be performed for example by conveying the parts through an annealing oven as they are conveyed from the blow molder downstream.

An example of the processing dimensions for either method referenced in the alternate preferred embodiment is set forth in Table I below.

TABLE I

| Constrained crystallization Treatment involves removing Constraining plug while finish Is at elevated temperature, e.g. 150° C., using the | 82 mm CT Finish Change (mils) | Average (inches) | | Average |
|---|---|---|---|---|
| residual heat to anneal | T 90 | T PL | T90 | T PL |
| | "As Crystallized" | 3.1562 | 3.1514 | |
| | "After Treatment" −30.4 | 3.1268 | 3.1210 | −29.4 |
| | "After Process" 0.4 | 3.1227 | 3.1214 | −4.1 |
| Process consists if 30 minute exposure to 97° C. water bath | | | | |
| Constrained crystallization Treatment involves 10 s exposure | 63 mm 4-lead Finish Average Change (mils) | Average (inches) | | |
| to 127° C. | T 90 | T PL | T 90 | T PL |
| | "As Crystallized" | 2.4438 | 2.4448 | |
| | "After Process" −11.4 | 2.4345 | 2.4334 | −9.3 |
| Process consists of 30 minute cook at 121° C. in retort chamber | | | | |

CT = continuous thread
T = dimension of outer thread diameter
PL = parting line
T90 = 90° from T PL Measurement It should be understood that although the discussion above is performed on blown bottles, the methods described are equally applicable to preform finishes. More particularly, the preform 124 having the initial finish section 116 can be crystallized to an intermediate finish diameter and, optionally, annealed as described above. This can be accomplished through the same methods and processes described herein stated differently, the preform 124 can be processed to include an intermediate finish section 116a as shown in FIG. 4 having an intermediate finish diameter 117a prior to the preform 124 being processed (blown) into the plastic container 112. It should also be understood that the methods and processes described herein can be preformed separately, such as for example crystallization of the initial finish section 116 of the preform 124 and annealing of the intermediate finish section 116a of the plastic container 112 after the plastic container 112 is formed.

Returning to the method of forming the plastic container 112 shown in FIG. 4, the container 112 is filled with a commodity and the closure 14 is secured to the intermediate finish section 116a to seal the container 112. Optionally, the closure 14 may be thermally processed to an appropriate temperature such as by steam or hot air, to radially expand or soften the closure 14 to form an intermediate closure (not shown) if the torque required to secure the closure 14 to the container 112 is too great. Thermal energy is then transferred to the plastic container 112 and therein to the commodity to heat the plastic container 112 above the glass transition temperature. This may induce another portion of the amorphous material to crystallize and slightly shrink. Whether shrinkage occurs or not, the dimensions of the finish section 116 including the thread members 122 and the finish diameter 117 remain within the predetermined range for one of several commercially available bottle finish sections such as 63 mm or 82 mm, so as to be engageable with the closure 14 of similar size. The resulting plastic container 112 has the finish section 116 which ensures a hermetic seal maintained with the closure 14.

The above described two step crystallization process compensates for shrinkage of the finish section 116 in a controlled manner and ensures the proper sealing function of the closure 14 on the container 112 during thermal process of the commodity.

The foregoing discussion discloses and describes certain preferred methods and preferred embodiments of the invention. One skilled in the art will readily recognize from such discussion, and from the accompanying drawings and claims, that changes and modifications can be made to the invention without departing from the true spirit and fair scope of the invention as defined in the following claims.

We claim:

1. A method of providing a thermally processed commodity retained within a plastic container, said method comprising:

providing a container made of a polyester material having an initial finish section;

reforming said container, which in part requires crystallizing at least a portion of said finish section, thereby forming an intermediate finish section;

dispensing a commodity within said container;

engaging a closure with said intermediate finish section, said intermediate finish section having an intermediate finish diameter which is slightly greater than a diameter of said closure; and thermally processing the commodity within said container such that said intermediate finish section remains within a predetermined range, whereby a finish section and said closure seal said container.

2. The method as claimed in claim 1 wherein said initial finish section includes an initial finish diameter and said finish section includes a finish diameter, said initial finish diameter being greater than said finish diameter.

3. The method of claim 2 wherein said intermediate finish diameter is substantially similar to said finish diameter.

4. The method of claim 2 wherein said intermediate finish diameter is within a predetermined range of said finish diameter.

5. The method of claim 1 wherein said reforming step includes annealing.

6. The method of claim 5 wherein the plastic container is provided with substantially a wide mouth finish section.

7. The method of claim 1 wherein at least a portion of said finish section is crystallized to at least 30%.

8. The method of claim 1 wherein said predetermined range is +0.005 to −0.0010 inches.

9. A method for providing a thermally processed commodity within a plastic container, said method comprising:

providing a container made of a polyester material having an initial finish section;

exposing said initial finish section to thermal energy, which in part requires crystallizing at least a portion of said finish section, such that said initial finish section shrinks to an intermediate finish section;

dispensing a commodity within said container;

engaging a closure with said intermediate finish section, said intermediate finish section having an intermediate finish diameter which is slightly greater than a diameter of said closure; and thermally processing the commodity within said container, said intermediate finish diameter remaining within a predetermined range, whereby a finish section and said closure seal said container.

10. The method of claim 9 wherein said exposing step includes annealing.

11. The method of claim 9 wherein at least a portion of said finish section is crystallized to at least 30%.

12. A method of providing a thermally processed commodity retained within a plastic container, said method comprising:

providing a preform having an initial finish section;

reforming said preform, which in part requires crystallizing at least a portion of said finish section, thereby forming a preform having an intermediate finish section;

molding said preform, thereby forming a container;

dispensing a commodity within said container;

engaging a closure with said intermediate finish section, said intermediate finish section having an intermediate finish diameter which is slightly greater than a diameter of said closure; and thermally processing the commodity within said container such that said intermediate finish section remains within a predetermined range, whereby a finish section and said closure seal said container.

* * * * *